(12) United States Patent
Kanematsu

(10) Patent No.: US 9,212,919 B2
(45) Date of Patent: Dec. 15, 2015

(54) ROAD LEARNING DEVICE

(71) Applicant: DENSO CORPORATION, Kariya, Aichi-pref. (JP)

(72) Inventor: Osamu Kanematsu, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/402,487

(22) PCT Filed: May 29, 2013

(86) PCT No.: PCT/JP2013/003394
§ 371 (c)(1),
(2) Date: Nov. 20, 2014

(87) PCT Pub. No.: WO2013/183252
PCT Pub. Date: Dec. 12, 2013

(65) Prior Publication Data
US 2015/0142306 A1    May 21, 2015

(30) Foreign Application Priority Data

Jun. 4, 2012  (JP) .................................. 2012-126983

(51) Int. Cl.
| | | |
|---|---|---|
| G01C 21/32 | (2006.01) | |
| G01C 21/26 | (2006.01) | |
| G01C 21/12 | (2006.01) | |
| G01C 21/30 | (2006.01) | |
| G09B 29/10 | (2006.01) | |
| G09B 29/00 | (2006.01) | |

(52) U.S. Cl.
CPC ................ *G01C 21/32* (2013.01); *G01C 21/30* (2013.01); *G09B 29/004* (2013.01); *G09B 29/106* (2013.01)

(58) Field of Classification Search
CPC ........ G01C 21/32; G01C 21/26; G01C 21/28; G01C 21/30; G09B 29/20; G09B 29/106; G09B 29/004

USPC ......... 701/411, 417, 446, 450, 473, 527, 532, 701/431
See application file for complete search history.

(56) References Cited

U.S. PATENT DOCUMENTS

| | | |
|---|---|---|
| 2007/0213927 A1 | 9/2007 | Ishigami et al. |
| 2008/0065327 A1 | 3/2008 | Sobue |
| 2010/0327455 A1 | 12/2010 | Nishihata et al. |
| 2011/0172913 A1 | 7/2011 | Nakamura et al. |

FOREIGN PATENT DOCUMENTS

| | | |
|---|---|---|
| JP | 2778374 B2 | 3/1994 |
| JP | H06-88732 A | 3/1994 |
| JP | H06-201392 A | 7/1994 |
| JP | 2009-192480 A | 8/2009 |

OTHER PUBLICATIONS

International Search Report and Written Opinion dated Aug. 20, 2013 in the corresponding PCT application No. PCT/JP2013/003394 (with English translation).

*Primary Examiner* — Adam Tissot
(74) *Attorney, Agent, or Firm* — Posz Law Group, PLC

(57) ABSTRACT

A road learning device includes: a map data storage device; an own vehicle location detection portion; a travel data storage device; an unregistered road travelling determination device; an unregistered road travel data storage control device; a potential unregistered road track creation device; a first correction device that corrects a potential unregistered road track to be a first track; a map-matching trial device for the first track; a primary successful map-matching determination device; a second correction device that corrects the first track to be a second track when primary map-matching is unsuccessful; a secondary successful map-matching determination device for the second track; and a new map data storage control device that discards a group of unregistered road travel data when secondary map-matching is unsuccessful, merges the first track with the map data when the primary map-matching is successful, and merges the second track with the map data when the secondary map-matching is successful.

7 Claims, 6 Drawing Sheets

ROAD LEARNING DEVICE

CROSS REFERENCE TO RELATED APPLICATION

The present disclosure is a U.S. national stage application of PCT/JP2013/003394 filed on May 29, 2013, and is based on Japanese Patent Application No. 2012-126983 filed on Jun. 4, 2012, the contents of which are incorporated herein by reference.

TECHNICAL FIELD

The present disclosure relates to a road learning device that registers a new road into map data using a track of a vehicle when the vehicle travels on a road not recorded in the map data.

BACKGROUND ART

A map data updating technique is known (for example, Patent Literature 1). According to this technique, when a vehicle travels on a road not stored in existing map data, such as a road newly opened to traffic, the map data is automatically changed or corrected or data is automatically added, so that the map data is updated with this road.

Patent Literature 1 describes that an own vehicle location is detected by an own vehicle location detection portion (including various sensors, such as a GPS receiver, a gyro sensor, and vehicle speed sensor) and a travelled track of the own vehicle is created by linking the own vehicle locations as a travelled track of an unregistered road (hereinafter, referred to as the potential unregistered road track). The potential unregistered road track is corrected by taking errors of the respective sensors into account and the corrected potential unregistered road track is stored as new map data corresponding to an unregistered road.

The potential unregistered road track is corrected in Patent Literature 1. In practice, however, the potential unregistered road track may possibly fail to conform to a shape of an actual unregistered road (accuracy is low) due to various errors, in particular, when the vehicle travels a long distance on an unregistered road. By registering the potential unregistered road track with such low accuracy as new map data corresponding to an unregistered road, map data with a significant error is registered. Hence, next time the vehicle travels on this road, the road may possibly be detected again as an unregistered road.

PRIOR ART LITERATURES

Patent Literature

Patent Literature 1: JP-A-2011-145159

SUMMARY OF INVENTION

It is an object of the present disclosure to provide a road learning device capable of increasing conformity accuracy of a potential unregistered road track to an unregistered road and thereby capable of registering highly-reliable new map data corresponding to an unregistered road.

According to an aspect of the present disclosure, a road learning device includes: a map data storage device that stores map data; an own vehicle location detection portion that detects a location of an own vehicle; a travel data storage device that stores travel data including the location of the own vehicle; an unregistered road travelling determination device that determines whether the own vehicle is travelling on a registered road indicated by the map data stored in the map data storage device or an unregistered road not indicated by the map data; an unregistered road travel data storage control device that controls the travel data storage device to store a group of the travel data of the unregistered road as a group of unregistered road travel data when the unregistered road travelling determination device determines that the own vehicle travels the unregistered road; a potential unregistered road track creation device that creates a travelled track of the unregistered road from the group of the unregistered road travel data stored in the travel data storage device as a potential unregistered road track; a first correction device that corrects the potential unregistered road track in a predetermined first correction manner so as to be a first track in order to merge the potential unregistered road track with the map data of the registered road; a map-matching trial device that successively applies map-matching of the unregistered road travel data to the first track; a primary successful map-matching determination device that determines whether the map-matching of the group of the unregistered road travel data to the first track is successful after the map-matching trial device executes a trial; a second correction device that corrects the first track in a second correction manner different from the first correction manner so as to be a second track when the primary successful map-matching determination device determines that the map-matching is unsuccessful; a secondary successful map-matching determination device that controls the map-matching trial device to execute the trial on the second track, and determines whether the map-matching of the group of the unregistered road travel data to the second track is successful; and a new map data storage control device that discards the group of the unregistered road travel data when the secondary successful map-matching determination device determines that the map-matching is unsuccessful, controls the map data storage device to store the first track by merging the first track with the map data of the registered road when the primary successful map-matching determination device determines that the map-matching is successful, and controls the map data storage device to store the second track by merging the second track with the map data of the registered road when the secondary successful map-matching determination device determines that the map-matching is successful.

In the road learning device, when the unregistered road travelling determination device determines that the own vehicle is travelling on an unregistered road, the unregistered road travel data storage control device controls the travel data storage device to store a group of travel data of the unregistered road as a group of unregistered road travel data. Subsequently, the potential unregistered road track creation device creates a potential unregistered road track of the unregistered road from the unregistered road travel data. In this case, the potential unregistered road track contains various errors of the travel data. However, by correcting the potential unregistered road track thus created using the first correction device, such errors can be reduced. It is, however, difficult to completely remove errors of the travel data and errors are accumulated particularly when a travel distance becomes longer. Accordingly, reliability that the first track obtained with a correction by the first correction device conforms to an actual unregistered road may be increased only moderately. In this case, whether the first track obtained with a correction by the first correction device conforms to an unregistered road is confirmed by means of map-matching. When a discrepancy is confirmed, the second track is obtained with a correction by the second correction device by changing a correction manner. Whether the second track conforms to the unregistered road or not is also confirmed by means of map-matching. Hence, conformity accuracy of the first track and the second track to the unregistered road can be increased. Moreover, when conformity of the second track obtained with a correction by the second correction device to the unregistered road cannot be confirmed, the second track is not stored as new map data. Hence, only new map data conforming to the unregistered road can be registered. When it is confirmed that the second track fails to conform to the unregistered road, a group of the unregistered road travel data is abandoned. Hence, a memory region of the travel data storage device is not used wastefully.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment of the present disclosure will be described with reference to the drawings. The embodiment below will describe a case where a road learning device of the present disclosure is applied to a car navigation system equipped to a vehicle. It should be appreciated, however, that the present disclosure is not limited to the embodiment below and can be implemented in various manners within the technical scope of the present disclosure.

Figure 1:
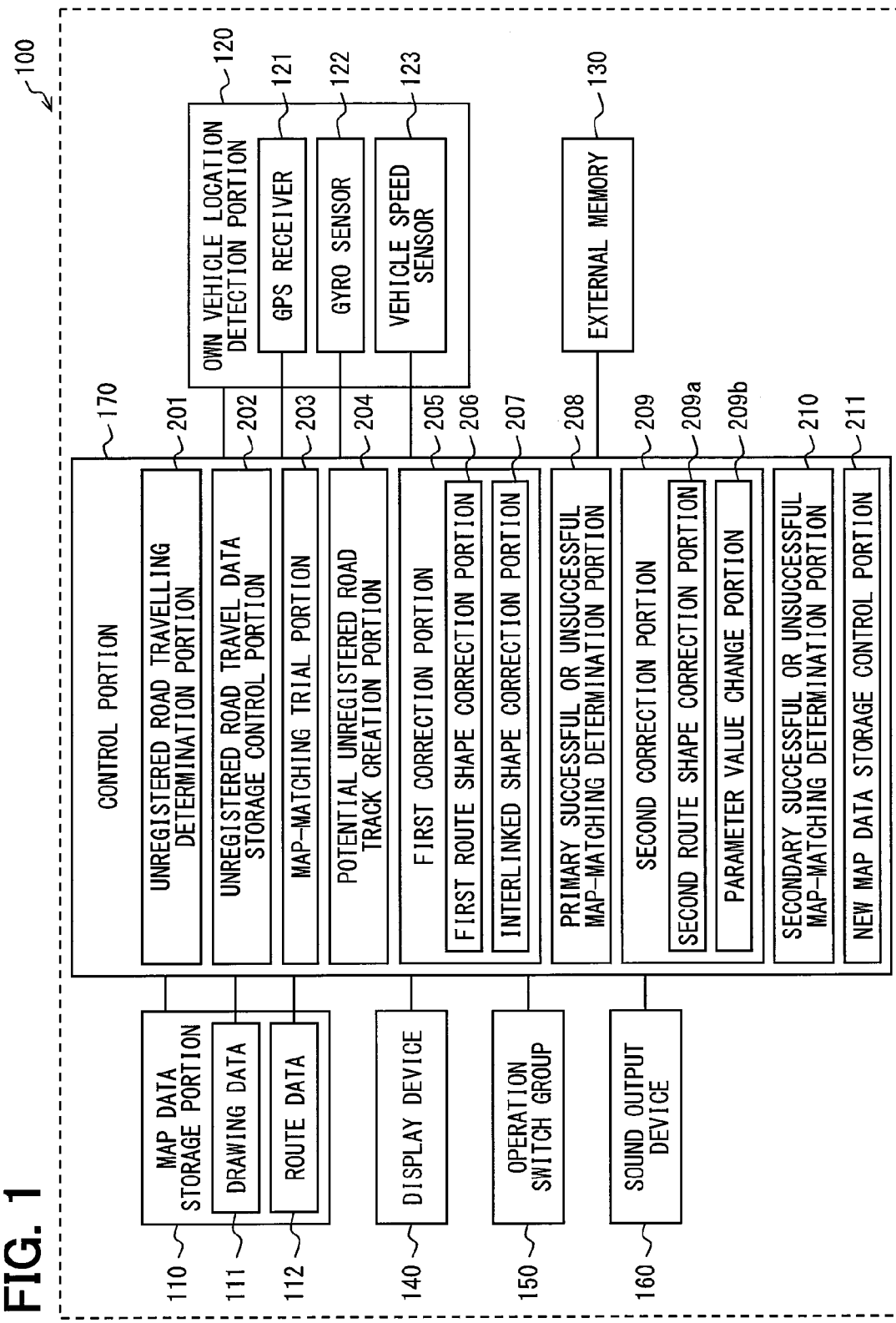
FIG. 1 is a functional block diagram of a road learning device of one embodiment.

Referring to FIG. 1, a car navigation system 100 corresponding to the road learning device includes a map data storage portion 110 corresponding to a map data storage portion, an own vehicle location detection portion 120 corresponding to an own vehicle location detection portion, an external memory 130 corresponding to a travel data storage portion, a display device 140, an operation switch group 150, a sound output device 160, and a control portion 170.

The map data storage portion 110 stores therein drawing data 111 made up of units of map information to draw a map on the display device 140 and map data 112 used for a route search or the like as well as unillustrated images and sound data for guidance. A hard disc and a memory can be used as a storage medium of the map data storage portion 110.

The drawing data 111 includes polygonal data of facilities, such as roads, rail roads, buildings, and private properties, background data to draw land forms, such as seas and rivers, and facility data storing location information or the like of respective facilities present on maps.

The map data 112 includes road network information made up of nodes indicating connection points and links connecting one node to another. The links and the nodes corresponding, respectively, to roads and intersections are provided with information, such as identification numbers assigned to the respective links and nodes, types of roads, such as an expressway, a toll road, a major highway, and a narrow street, traffic regulations, such as a right or left turn prohibition, a one-way traffic, and a speed limit, widths of roads, the number of lanes, inclination, and shapes of roads. Costs are set for the respective links and nodes on the basis of the information specified above. The control portion 170 performs an optimal route calculation on the basis of the map data using a known Dijkstra's algorithm.

The own vehicle location detection portion 120 includes a GPS receiver 121, a gyro sensor 122, and a speed sensor 123. The GPS receiver 121 receives a radio wave transmitted from a satellite of a GPS (Global Positioning System) via a GPS antenna and detects latitude and longitude information and present time information. The gyro sensor 122 detects magnitude of rotational motion applied to the vehicle and calculates a moving direction of the vehicle. The speed sensor 123 detects a speed of the vehicle. It should be noted that the respective sensors 121 through 123 have unique errors.

The own vehicle location detection portion 120 detects (calculates) an own vehicle location by means of dead-reckoning navigation on the basis of travel data, such as the own vehicle location information and the present time information obtained in the GPS receiver 121 on the basis of the latitude and the longitude it has received, a vehicle moving direction calculated in the gyro sensor 122, and the vehicle speed information obtained from the speed sensor 123. More specifically, a relative own vehicle location is detected in every predetermined interval (for example, every two meters) on the basis of the own vehicle location information detected by the GPS receiver 121, a distance the vehicle has travelled which is calculated on the basis of the own vehicle location information, a vehicle speed detected by the speed sensor 123, and a moving direction detected by the gyro sensor 122. The own vehicle location detection portion 120 may additionally include sensors other than the sensors described above, such as a geomagnetic sensor to detect a direction of forward movement from geomagnetism.

The external memory 130 is formed, for example, of a flash memory or an EEPROM.

The display device 140 is formed of a liquid crystal display capable of displaying colors. The display device 140 displays a map made up of the background data, the polygonal data, and the like stored in the drawing data 111 on a display screen, and a mark indicating an actual location of the vehicle, a guide route to a destination, and the like are superimposed on the map. Sign information, names, and landmarks of respective facilities, information on nearby traffic jam, and the like may be displayed by superimposition on the map. The display device may use any type other than the liquid crystal display, such as a plasma display and an organic EL display.

The operation switch group 150 is formed integrally with the display device 140, and a touch panel installed on the display screen and button switches provided on the periphery of the display device 140 are used. The touch panel and the display device 140 are layered and formed into one unit. The touch panel can be any one of a pressure-sensitive type, an electromagnetic induction type, a capacitance type, and a combination of the foregoing.

The sound output device 160 is formed of a speaker and outputs sounds of various types of guidance according to guidance sound data or the like stored in the map data storage portion 110.

The control portion 170 is chiefly formed of a known micro-computer formed of a CPU, a ROM, a RAM, an I/O, and a bus line interconnecting these components. The control portion 170 performs map display processing to display a map or the like in a range specified by an operation on the operation switch group 150 on the display device 140 and route guide processing to guide a route by automatically calculating an optimal route from an actual location to a destination according programs stored in the ROM or the like.

Due to a software configuration of programs, the control portion 170 functions as an unregistered road travelling determination portion 201, an unregistered road travel data storage control portion 202, a map matching trial portion 203, a potential unregistered road track creation portion 204, a first correction portion 205, a first route shape correction portion 206, an interlinked shape correction portion 207, a primary successful or unsuccessful map-matching determination portion 208, a second correction portion 209, a second route shape correction portion 209a, a parameter value change portion 209b, a secondary successful or unsuccessful map-matching determination portion 210, and a new map data storage control portion 211.

Figure 2:
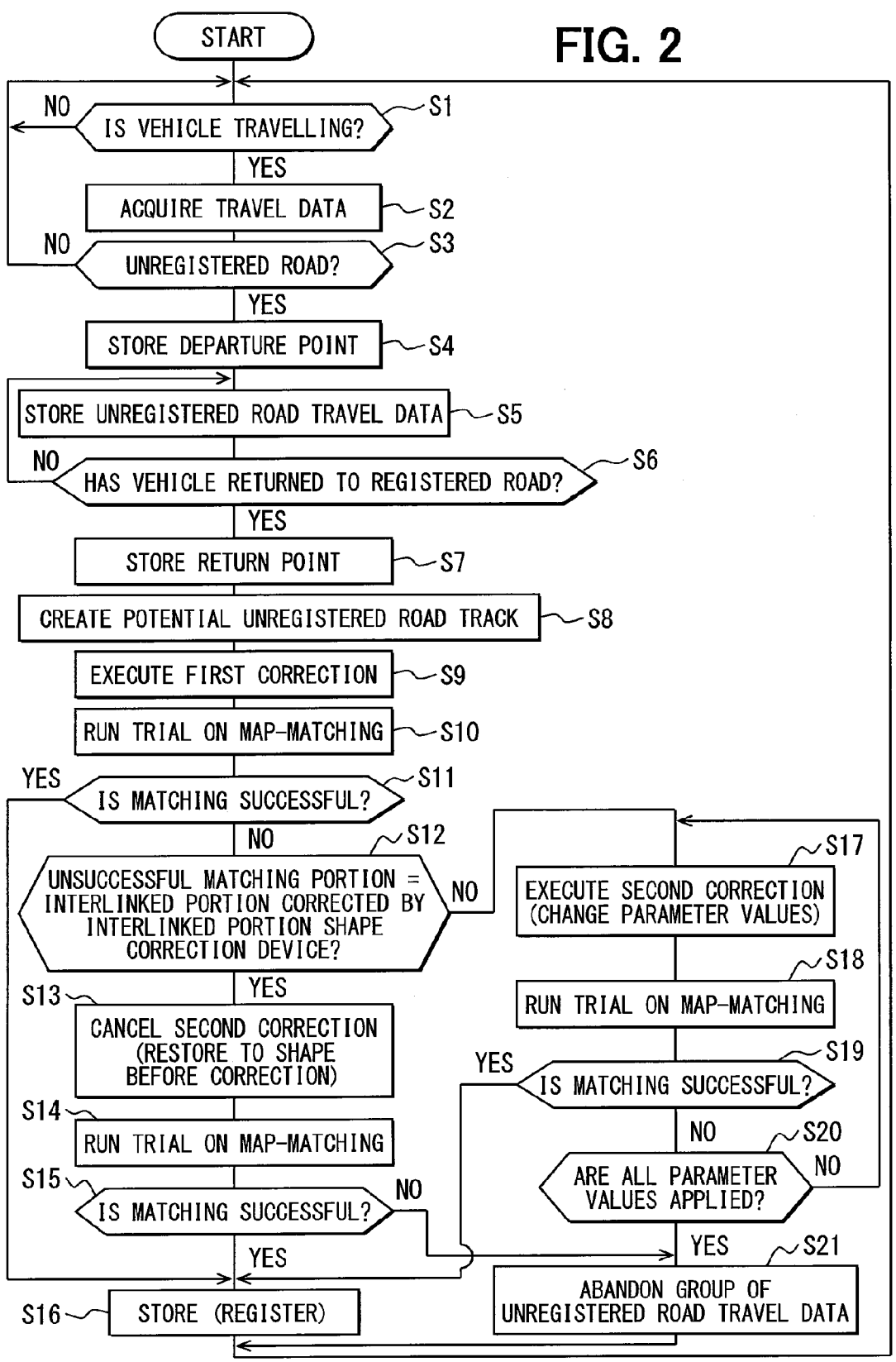
FIG. 2 is a flowchart depicting a control content of a control portion.

A content of control of the control portion 170 including the functions of the respective portions above will be described with reference to FIG. 2.

At Step S1, whether the own vehicle is travelling or not is determined. When the vehicle is travelling, advancement is made to Step S2, at which travel data is successively acquired. Subsequently, a determination is made at Step S3 as to whether map-matching between the own vehicle location specified by the travel data and the map data 112 stored in the map data storage portion 110 is unsuccessful (unregistered road) (registered road travelling determination portion 201). In the map matching, the own vehicle location calculated on the basis of the travel data by means of dead-reckoning navigation and the travelled track of the own vehicle are checked against a shape of a link corresponding to a road on the map stored in the map data storage portion 110 and the own vehicle location is positioned (map-matched) on the road (or a potential unregistered road track) on the map.

More specifically, a shape of a travelled track from an actual location to a location tracked back from the actual location by a predetermined interval (for example, 30 meters) in the travelled track of the own vehicle is checked against shapes of links corresponding to respective roads present on the map near the own vehicle location (latitude and longitude information) detected by the GPS receiver 121. A road having a link showing maximum correlation is estimated as being a road on which the vehicle is travelling. In a case where correlations with all of the roads are lower than a set threshold as a result of comparisons between a shape of the travelled track of the own vehicle and shapes of the respective roads, map matching is determined as being infeasible on the ground that the vehicle is not travelling on any road stored in the map data storage portion 110. In short, it is determined that the vehicle is travelling on an unregistered road.

When it is determined that the vehicle is travelling on an unregistered road (the vehicle departed from a registered road and entered an unregistered road), advancement is made to Step S4, at which a point the system can identify with confidence, that is, a departure point (meaning a node which is a point immediately before the departure in the map data of registered roads) immediately before the departure on the registered road from which the vehicle departed (hereinafter, referred to as the departure-side registered road) is stored into the external memory 130. At subsequent Step S5, travel data of this unregistered road (unregistered road travel data) is successively stored (unregistered road travel data storage control portion 202). When it is determined at Step S6 that the own vehicle returned to a registered road, a return point (meaning a node which is a point immediately after the return in the map data of registered roads) immediately after the return to a registered road to which the vehicle returned (hereinafter, referred to as the return-side registered road) is stored into the external memory 130 at Step S7. By this time, the departure point, the return point, and a group of unregistered road travel data comparable to a travelled distance of the unregistered road are stored in the external memory 130.

Subsequently, a potential unregistered road track M is created at Step S8 by successively linking a group of own vehicle locations indicated by a group of the unregistered road travel data (potential unregistered road track creation portion 204). In other words, a potential unregistered road track M of the own vehicle is calculated by linking own vehicle locations indicated by unregistered road travel data detected each time the vehicle moves two meters.

At Step S9, a first correction is made to the potential unregistered road track M (first correction portion 205). The first correction portion 205 has a first route shape correction portion 206 and an interlinked shape correction portion 207. The first route shape correction portion 206 is included with the purpose as follows. That is, the unregistered road travel data has a slight measure of error in a direction of forward movement of the vehicle due to a voltage offset of the gyro sensor 122. Hence, as the vehicle travels a longer distance, a difference between the potential unregistered road track M, which is obtained by connecting the unregistered road travel data, and an actual travelled track (actual unregistered road) becomes so significant that the potential unregistered road track M may not be smoothly linked to a departure-side registered road S and a return-side registered road T. A route shape correction is made to overcome this inconvenience.

Figure 3:
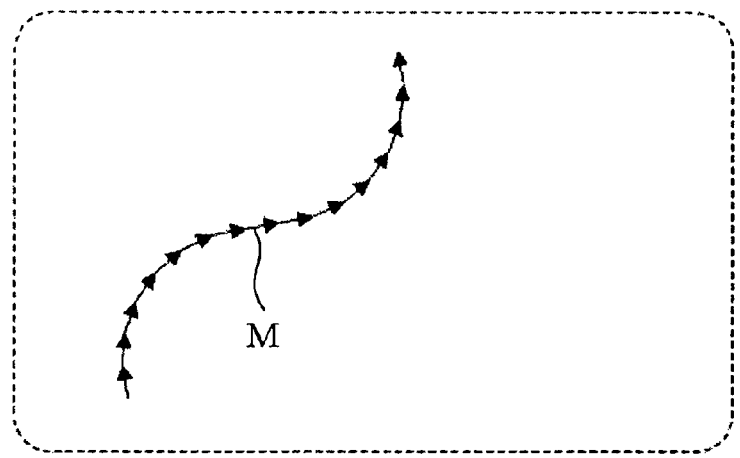
FIG. 3 is a schematic view of a potential unregistered road track before correction.
Figure 4:
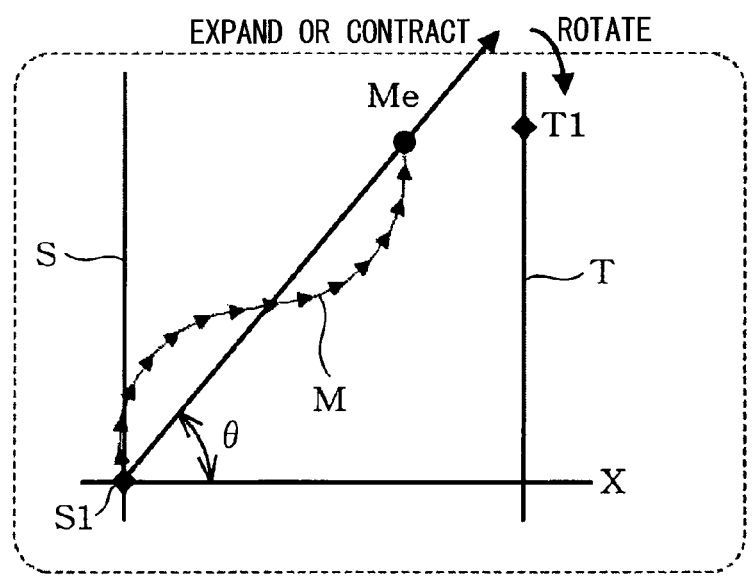
FIG. 4 is a schematic view before a potential unregistered road track is connected to a departure-side registered road S and a return-side registered road T.
Figure 5:
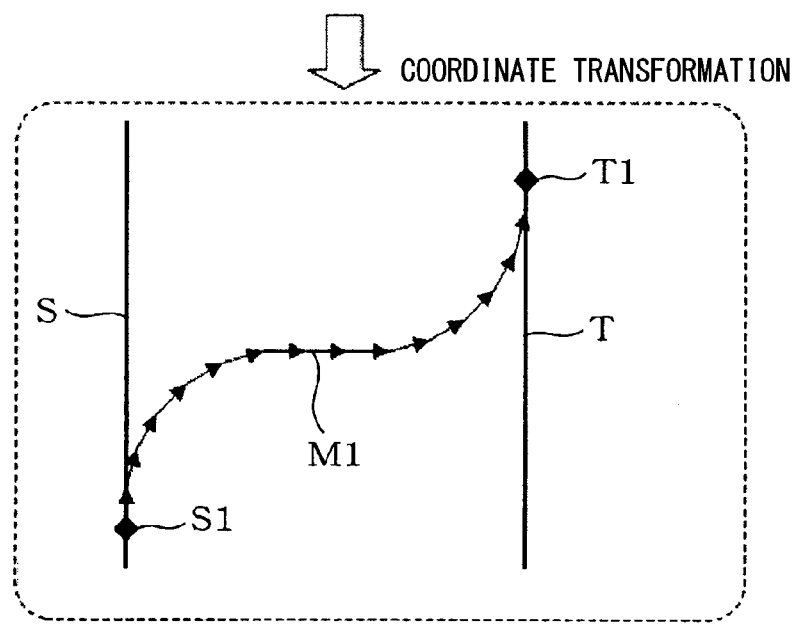
FIG. 5 is a schematic view showing a state in which the potential unregistered road track is connected to the departure-side registered road S and the return-side registered road T.

Assume that the potential unregistered road track M is a miracle of a shape as shown in FIG. 3. Here, as is shown in FIG. 4, a start point of the potential unregistered road track M is brought in agreement with a departure point S1 on the departure-side registered road S by moving the potential unregistered road track M parallel to itself. Subsequently, an end point Me of the potential unregistered road track M is brought in agreement with a return point T1 on the return-side registered road T. In this case, let the departure point S1 be an origin (0, 0) of an xy-coordinate system. Here, coordinate transformation (rotation and expansion or contraction) is performed in accordance with Equation (1) below (affine transformation). Referring to FIG. 4, a coordinate of the departure point S1, a coordinate of the return point T1, and a coordinate of the end point Me of the potential unregistered road track M are known. Hence, unknown parameters in Equation (1) below, that is, the potential unregistered road track M, rotational angles θ with respect to a first track M1 and a second track M2, a length a in an x-axis direction, and a length d in a y-axis direction, are found. In this case, θ, a, and d are preliminarily set to appropriate values as default values and a route shape of the potential unregistered road track M is corrected by rotating and contracting the potential unregistered road track M (see FIG. 5). A track corrected by the route shape correction portion 206 or the interlinked shape correction portion 207 or both is referred to as the first track M1.

$$\begin{pmatrix} x' \\ y' \end{pmatrix} = \begin{pmatrix} a, 0 \\ 0, d \end{pmatrix} \begin{pmatrix} \cos\theta & -\sin\theta \\ \sin\theta & \cos\theta \end{pmatrix} \begin{pmatrix} x \\ y \end{pmatrix} \quad (1)$$

In equation (1) above, θ is a rotational angle, a is a length in the x-axis direction, and d is a length in the y-axis direction.

Further, the interlinked shape correction portion 207 is included with the purpose as follows. That is, an interlinked portion of the departure-side registered road S or the return-side registered road T with the first track M1 may be an intersection, a branch point to a bypass, a branch road to an expressway, or a branch road from an expressway. In the case of an intersection, a shape (T shape or a Y shape) that allows the first track M1 to linearly link to the departure-side registered road S or the return-side registered road T is preferable. An advantage achieved in this case is that it can be determined that the first track M1 is likely a two-way road. On the contrary, it is preferable to directly adopt a shape of an interlinked portion of the first track M1 in the case of a branch road. An advantage achieved in this case is that it can be determined that the first track M1 is likely a one-way road.

Figure 6:
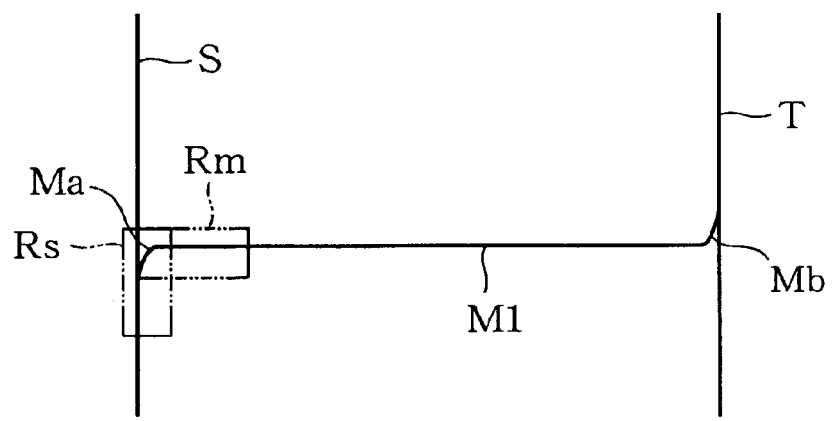
FIG. 6 is a view used to describe a shape correction of an interlinked portion.
Figure 7:
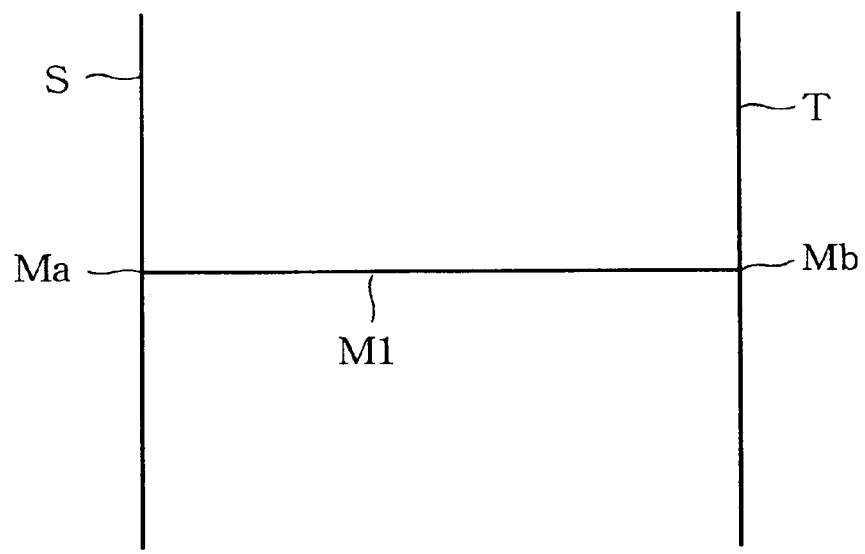
FIG. 7 is a view used to describe the interlinked portion after a shape correction.

The interlinked portion shape correction portion 207 makes a correction to the interlinked shapes of interlinked portions of the first track M1 obtained with a correction as above to the departure-side registered road S and the return-side registered road T under a predetermined condition. That is, as is shown in FIG. 6, given that a shape of an interlinked portion Ma of the departure-side registered road S and the first track M1 is of a relatively small arc shape. Herein, a determination is made as to whether the entire track of the interlinked portion Ma falls within an estimated road region Rs (having a width of the registered road pre-stored in the map data and a predetermined length) of the departure-side registered road S and an estimated road region Rm (having uniquely a default road width (for example, a width of one lane) and a predetermined length) of the potential unregistered road track M. When the entire track of the interlinked portion Ma falls within these regions (this corresponds to the predetermined condition), the interlinked portion Ma is determined as being an intersection (herein, a T shape). The interlinked portion Ma is therefore corrected so as to be linear as shown in FIG. 7. Otherwise, it can be determined that the interlinked portion Ma is likely a branch road instead of an intersection. It is therefore determined that it is preferable to make the interlinked portion Ma into an arc shape (an intact arc shape of the first track M1). An interlinked portion Mb with the return-side registration road T is corrected in the same manner as above under the predetermined condition.

Figure 8:
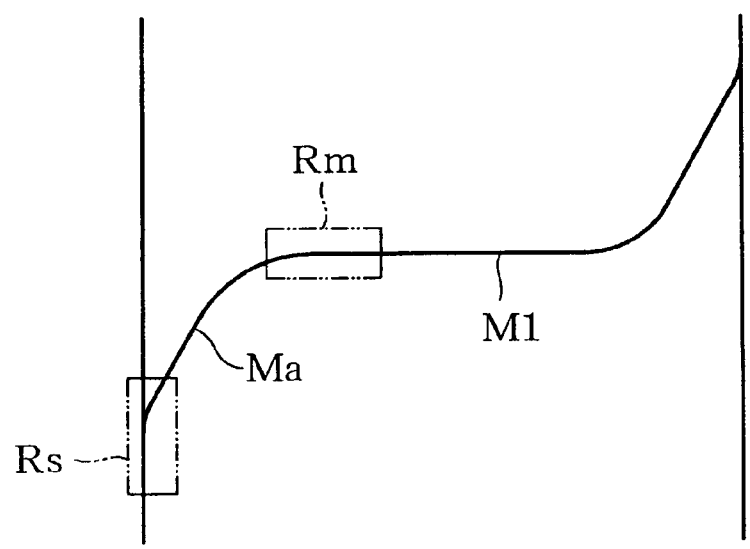
FIG. 8 is a view used to describe a different shape correction of the interlinked portion.

In a case as shown in FIG. 8 where the interlinked portion Ma of the first track M1 is of a relatively large arc shape, part of the interlinked portion Ma is out of the estimated road region Rs of the departure-side registered road S and the estimated road region Rm of the first track M1. It is therefore determined that the interlinked portion Ma is not an intersection but a curved branch road and the shape is left intact.

Thereafter, a trial is run on simulative vehicle travelling to successively apply map-matching of the unregistered road travel data to the first track M1 at Step S10 (map-matching trial portion 203).

At subsequent Step S11, a determination is made as to whether the map-matching of a group of the unregistered road travel data to the first track M1 is successful or not (primary successful or unsuccessful map-matching determination portion 208). When it is determined that the map-matching is successful, advancement is made to Step S16, at which the first track M1 is stored into the map data storage portion 110 by merging the first track M1 with the map data of registered roads. The map data is created by providing a node or a link to the first track M1 or a second track M2 described below.

When it is determined at Step S11 that the map-matching is unsuccessful, advancement is made to Step S12, at which a determination is made as to whether an unsuccessful map-matching portion is the interlinked portion (interlinked portion Ma or Mb or both) corrected by the interlinked portion shape correction portion 207. When a determination of "YES" is made, advancement is made to Step S13, at which the first track M1 is corrected so as to be a second track M2 by making a correction (second correction) to restore only the unsuccessful map-matching interlinked portion to the interlinked portion of the potential unregistered road track M on the ground that the correction on the interlinked portion of interest by the interlinked shape correction portion 207 is not effective. In short, the potential unregistered road track M1 is corrected again by the first route correction portion 206 alone so as to be the second track.

Figure 9:
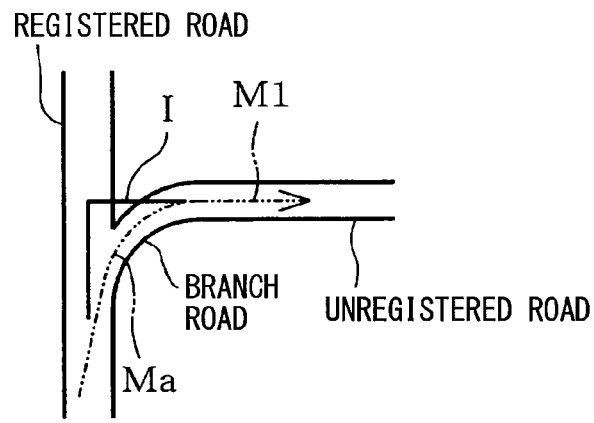
FIG. 9 is a view used to describe an example of an improper shape correction of an interlinked portion.

For example, in a case as shown in FIG. 9 where an interlinked portion of an unregistered road is actually a branch road, an interlinked portion may possibly be determined (corrected) as being an intersection when a radius of the arch shape is small like an interlinked portion indicated by a capital I of the first track M1 in the drawing. In this case, the interlinked portion is determined as being an unsuccessful map-matching portion in Step S12. Hence, the original potential unregistered road track M is corrected by the route shape correction portion 206 alone at Step S13, so that the unsuccessful map-matching portion is restored to the interlinked portion Ma or Mb or both of the original potential unregistered road track M.

After Step S13, advancement is made to Step S14, at which a trial is run on simulative vehicle travelling to successively apply map-matching of the unregistered road travel data to the second track M2 (map-matching trial portion 203). Subsequently, a determination is made at Step S15 as to whether map-matching of a group of the unregistered road travel data to the second track M2 is successful (secondary successful or unsuccessful map-matching determination portion 210). When it is determined that the map-matching is successful, advancement is made to Step S16, at which the second track M2 is stored into the map data storage portion 110 by merging the second track M2 into map data of registered roads (new map data storage control portion 211).

When a determination of "NO" is made at Step S12, advancement is made to Step S17, at which a correction is made by the second route shape correction portion 209a in the second correction portion 209. That is, the route shape of the first track M1 is corrected by successively changing the parameters described above, angle θ and lengths a and d (parameter value change portion 209b).

In other words, because a determinant of Equation (1) above has three unknowns, θ, a, and b, more than one solution is found by solving this determinant alone. Hence, values of θ, a, and b are changed little by little.

A matrix (a, d) is a matrix to expand or contract an overall length. Hence, each time Step S17 is performed, values of a and b are changed so that a length of a vector of the first track M1 (determined by a length a in the x-axis direction and a length d in the y direction) gradually changes from a minimum (a distance of a straight line between the departure point and the return point) to a maximum (a distance of a way of the first track M1 between the departure point and the return point). Also, because a connection angle to a registered road can be any angle, an angle θ is changed little by little in a range of 0 to 360 degrees for respective values of a and b. Consequently, each time Step S12 is performed, the first track M1 is successively corrected (the second track M2 is created and the first track M1 is successively updated). It is assumed that all of the parameters are applied when all of the values are changed.

Figure 10:
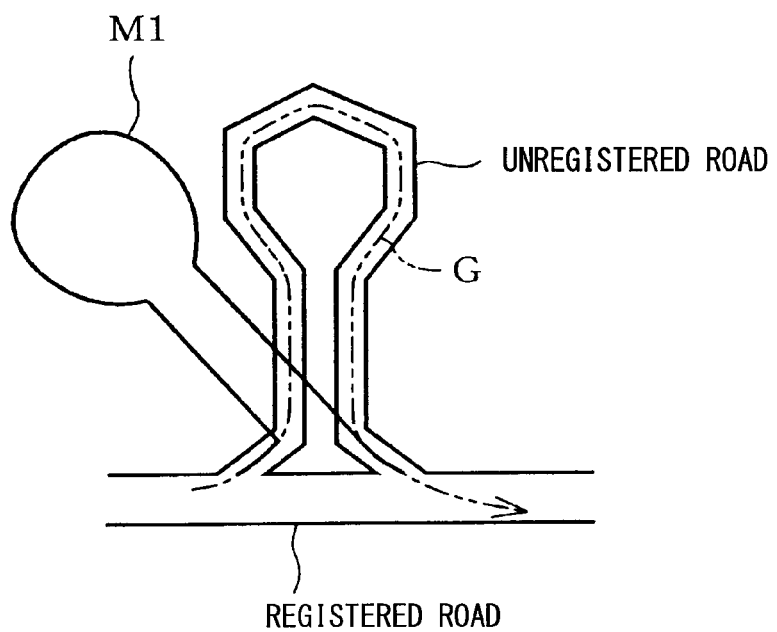
FIG. 10 is a view used to describe an example of an improper route shape correction.

Assume that an actual unregistered road is of a unique shape with respect to a registered road as is shown in FIG. 10. In this case, even when an actual travelled track is the one indicated by a capital G, the first track M1 may noticeably differ from the actual travelled track G in some cases. In such a case, a determination of "NO" is made in Step S11 and a determination of "NO" is made in Step S12, too. Hence, the second track M2 is obtained at Step S17 by correcting the route shape of the first track M1 by successively changing the parameters, an angle θ and lengths a and d.

After Step S17, advancement is made to Step S18, at which a trial is run again on map-matching. When it is determined in subsequent Step S19 (secondary successful or unsuccessful map-matching determination portion 210) that map-matching is successful, advancement is made to Step S16, at which the second track M2 is stored into the map data storage portion 110 as new map data.

When it is determined in Step S19 that the map-matching is unsuccessful, a determination is made as to whether all of originally prepared change values are applied to change the parameters (whether changing of the parameters is completed). When all of the change values are applied, a group of the unregistered road travel data in the external memory 130 is abandoned (deleted) at Step S21 on the ground that map-matching has no chance of success.

According to the embodiment described above, a trial is run on simulative vehicle travelling by the map-matching trial portion 203 by subjecting the first track M1 created with a correction by the first correction portion 205 to map-matching using a group of the unregistered road travel data, and a determination is made by the primary successful or unsuccessful map-matching determination portion 208 as to whether the map-matching of a group of the unregistered road travel data to the first track M1 is successful or not. Hence, whether the first track M1 conforms to an unregistered road or not can be confirmed without having to make the own vehicle actually travel again. When the map-matching of a group of the unregistered road travel data to the first track M1 is unsuccessful, the second track M1 is created by correcting the first track M1 again by the second correction portion 209 that makes a correction in a different manner from the first correction portion 205. Thereafter, map-matching is performed again and a determination is made by the secondary successful or unsuccessful map-matching determination portion 210 as to whether map-matching of a group of the unregistered road travel data to the second track M2 is successful or not. In other words, in this case, too, whether the second track M2 created with a correction by the second correction portion 209 conforms to an unregistered road or not can be confirmed without having to make the own vehicle actually travel again. When it is determined that the map-matching is successful, the second track M2 can be determined as being proper map data of an unregistered road. Accordingly, the new map data storage control portion 211 controls the map data store portion 110 to store the first track M1 or the second track M2 as proper map data by merging the first track M1 or the second track M2 with map data of registered roads.

As has been described, whether the first track M1 created with a correction by the first correction portion 205 conforms to an unregistered road or not is confirmed by means of map-matching, and when a discrepancy is confirmed, the second track M2 is created by the second correction portion 209 by making a correction in a different manner. Hence, the potential unregistered road track M can be corrected so as to conform to an actual unregistered road. Conformity accuracy of the first track M1 or the second track M2 obtained with these corrections to an unregistered road can be thus increased. Moreover, the first track M1 or the second track M2 corrected, respectively, by the first correction portion 205 and the second correction portion 209 is stored only when conformity to an unregistered road is confirmed. Hence, new map data conforming to an unregistered road alone can be registered.

When it is confirmed that the second track M2 fails to conform to an unregistered road even when corrected by the second correction portion 209, a group of the unregistered road travel data is abandoned. Hence, a memory region of the travel data storage portion 110 is not used wastefully. A group of the unregistered road travel data may be abandoned once the first track M1 or the second track M2 is stored at Step S16.

In the embodiment above, the first correction portion 205 has the first route shape correction portion 206 that makes a correction in such a manner that a shape of the potential unregistered road track M is corrected so as to be the first track M2 by rotating and expanding or contracting the potential unregistered road track M using arbitrary parameters θ, a, and d, whereas the second correction portion 209 has the second route shape correction portion 209a that makes a correction in such a manner that a shape of the first track M1 is corrected so as to be the second track M2 by rotating and expanding or contracting the first track M1 using the parameters having different values from those used in the route shape correction portion 206.

When configured in this manner, the route shape of the potential unregistered road track M can be corrected in different correction manners so that the first track M1 or the second track M2 conforming to a route shape of an actual unregistered road can be obtained.

In this embodiment, the second correction portion 209 includes the parameter value change portion 209b that successively changes values of the parameters used in the second route shape correction portion 209a when the secondary successful or unsuccessful map-matching determination portion 210 determines that map-matching to the second track M2 obtained by the second route shape correction portion 209a is unsuccessful until the secondary successful or unsuccessful map-matching determination portion 210 determines that the map-matching is successful. In addition, the new map data storage control portion 211 abandons a group of the unregistered road travel data on the condition that when the secondary successful or unsuccessful map-matching determination portion 210 determines that map-matching is unsuccessful even after changing of values of all of the parameters by the parameter value change portion 209b is completed.

When configured in this manner, in a case where the map-matching is unsuccessful (Step S18), the second track M2 is successively changed by successively changing values of the parameters, an angle θ and lengths a and d, and a trial is run repeatedly on the map-matching. Hence, a probability of successful map-matching of the second track M2 can be further increased. A probability that the second track M2 conforms to an actual unregistered road can be thus increased markedly. In addition, a group of the unregistered road travel data is abandoned when the second track M2 fails to conform to an actual unregistered road even after values of all the parameters are changed. Hence, a group of the unregistered road travel data that is really improper can be abandoned.

Also, according to this embodiment, the first correction portion 205 further has the interlinked shape correction portion 207 that corrects interlinked shapes of the respective interlinked portions of the potential unregistered road track M to the departure-side registered road and the return-side registered road under the predetermined condition. After the map-matching trial portion 203 runs a trial, the primary successful or unsuccessful map-matching determination portion 208 determines whether map-matching of a group of the unregistered road travel data to the first track M1 is successful or not. Moreover, in a case where it is determined that the map-matching is unsuccessful, an unsuccessful map-matching portion in the first track M1 can be identified. Further, when the primary successful or unsuccessful map-matching determination portion 208 determines that the map-matching is unsuccessful and the unsuccessful map-matching portion in the first track M1 is the interlinked portion corrected by the interlinked portion shape correction portion 207, a correction is made to restore a shape of the interlinked portion of interest to a shape of the interlinked portion of the potential unregistered road track M. When the unsuccessful map-matching portion in the first track M1 is other than the interlinked portion, a correction is made by the second route shape correction portion 209a.

When configured in this manner, in a case where the correction made by the interlinked portion shape correction portion 207 is not effective, a correction is made so as to restore only the interlinked portion of the first track M1 to a shape of the interlinked portion of the potential unregistered road track M. Hence, unsuccessful map-matching due to a correction on the interlinked portion can be reduced to the least possible extent.

Also, according to this embodiment, rotation and expansion or contraction by the first route shape correction portion 206 and the second route shape correction portion 209a are performed by coordinate transformation using Equation (1) above and θ, a, and d are set as the parameters for which values are changed. Hence, a correction that changes a route shape little by little can be made. A probability of successfully map-matching can be thus increased.

Also, according to this embodiment, the own vehicle location detection portion 120 detects a location and an orientation of the own vehicle while the own vehicle is travelling and detects an own vehicle location on the basis of travel data including own vehicle location data and orientation data. Hence, detection accuracy of the own vehicle location is high and accuracy of a group of unregistered road travel data generated from the travel data can be therefore increased.

As has been described, according to the road learning device of the embodiment above, conformity accuracy of the potential unregistered road track to an unregistered road can be increased and highly reliable new map data corresponding to an unregistered road can be registered.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A road learning device comprising:
a map data storage device that stores map data;
an own vehicle location detection portion that detects a location of an own vehicle;
a travel data storage device that stores travel data including the location of the own vehicle;
an unregistered road travelling determination device that determines whether the own vehicle is travelling on a registered road indicated by the map data stored in the map data storage device or an unregistered road not indicated by the map data;
an unregistered road travel data storage control device that controls the travel data storage device to store a group of the travel data of the unregistered road as a group of unregistered road travel data when the unregistered road travelling determination device determines that the own vehicle travels the unregistered road;
a potential unregistered road track creation device that creates a travelled track of the unregistered road from the group of the unregistered road travel data stored in the travel data storage device as a potential unregistered road track;
a first correction device that corrects the potential unregistered road track in a predetermined first correction manner so as to be a first track in order to merge the potential unregistered road track with the map data of the registered road;
a map-matching trial device that successively applies map-matching of the unregistered road travel data to the first track;
a primary successful map-matching determination device that determines whether the map-matching of the group of the unregistered road travel data to the first track is successful after the map-matching trial device executes a trial;
a second correction device that corrects the first track in a second correction manner different from the first correction manner so as to be a second track when the primary successful map-matching determination device determines that the map-matching is unsuccessful;
a secondary successful map-matching determination device that controls the map-matching trial device to execute the trial on the second track, and determines whether the map-matching of the group of the unregistered road travel data to the second track is successful; and
a new map data storage control device that discards the group of the unregistered road travel data when the secondary successful map-matching determination device determines that the map-matching is unsuccessful, controls the map data storage device to store the first track by merging the first track with the map data of the registered road when the primary successful map-matching determination device determines that the map-matching is successful, and controls the map data storage device to store the second track by merging the second track with the map data of the registered road when the secondary successful map-matching determination device determines that the map-matching is successful.

2. The road learning device according to claim 1, wherein the unregistered road travel data storage control device controls the travel data storage device to store; in addition to the group of the unregistered road travel data, a point stored in the map data and presented immediately before a departure when the own vehicle departs from a departure-side registered road and enters into the unregistered road; and a point stored in the map data and presented immediately after a return to a return-side registered road when the own vehicle returns to the registered road from the unregistered road.

3. The road learning device according to claim 1
wherein the first correction device includes a first route shape correction device that corrects a shape of the potential unregistered road track in the first correction manner so as to be the first track by rotating and expanding or contracting the potential unregistered road track using a certain parameter, and
wherein the second correction device includes a second route shape correction device that corrects a shape of the first track in the second correction manner so as to be the second track by rotating and expanding or contracting the first track using the certain parameter having a value different from a value used in the first route shape correction device.

4. The road learning device according to claim 3,
wherein the second correction device includes a parameter value change device that successively changes the value of the parameter used in the second route shape correction device when the secondary successful map-matching determination device determines that the map-matching to the second track obtained by the second route shape correction device is unsuccessful until the secondary successful map-matching determination device determines that the map-matching is successful, and
wherein the new map data storage control device discards the group of the unregistered road travel data under a condition that the secondary successful map-matching device determines that the map-matching is unsuccessful even after the parameter value change device completes to change all values of the parameter.

5. The road learning device according to claim 3
wherein the first correction device further includes an interlinked shape correction device that corrects an interlinked shape of each interlinked portion of the potential unregistered road track between the departure-side registered road and the return-side registered road under a predetermined condition,
wherein the primary successful map-matching determination device identifies an unsuccessful map-matching portion in the first track when the map-matching is unsuccessful, and
wherein the second correction device: corrects a shape of the interlinked portion to be restored to a shape of the interlinked portion of the potential unregistered road track when the primary successful map-matching determination device determines that the map-matching is unsuccessful and the unsuccessful map-matching portion in the first track is the interlinked portion corrected by the interlinked portion shape correction device; and corrects a shape of the first track so as to be the second track using the second route shape correction device when the unsuccessful map-matching portion in the first track is not the interlinked portion.

6. The road learning device according to claim 3,
wherein the first route shape correction device and the second route shape correction device perform a coordinate transformation in order to execute rotation and expansion or contraction according to an equation No. 1 of:

$$\begin{pmatrix} x' \\ y' \end{pmatrix} = \begin{pmatrix} a, 0 \\ 0, d \end{pmatrix} \begin{pmatrix} \cos\theta & -\sin\theta \\ \sin\theta & \cos\theta \end{pmatrix} \begin{pmatrix} x \\ y \end{pmatrix}$$

where θ is a rotational angle in a map, a is a length in an x-axis direction in the map, and d is a length in a y-axis direction in the map, and
wherein the parameter includes θ, a, and d.

7. The road learning device according to claim 1,
wherein the own vehicle location detection device detects location data and orientation data of the own vehicle while the own vehicle is travelling, and detects the location of the own vehicle based on the travel data including own vehicle location data and the orientation data.

* * * * *